United States Patent [19]

Kern

[11] 4,080,090
[45] Mar. 21, 1978

[54] TAP DRIVER ASSEMBLY

[75] Inventor: Leon O. Kern, Frankenmuth, Mich.

[73] Assignee: Houdaille Industries, Inc., Buffalo, N.Y.

[21] Appl. No.: 747,077

[22] Filed: Dec. 2, 1976

[51] Int. Cl.² .................. B23B 51/06; B23G 3/06
[52] U.S. Cl. ...................... 408/59; 10/89 F; 10/141 M; 279/20; 408/141; 408/714
[58] Field of Search ............ 408/57, 59, 141, 714; 279/20; 10/89 F, 139 R, 141 H

[56] References Cited

U.S. PATENT DOCUMENTS

| 956,298 | 4/1910 | Cuhady | 10/89 F |
|---|---|---|---|
| 3,024,030 | 3/1962 | Koch | 279/20 |
| 3,905,609 | 9/1975 | Sussman | 279/20 |

FOREIGN PATENT DOCUMENTS

| 2,234,077 | 1/1975 | France | 10/139 R |

Primary Examiner—Z. R. Bilinsky
Attorney, Agent, or Firm—Hill, Gross, Simpson, Van Santen, Steadman, Chiara & Simpson

[57] ABSTRACT

A Tap Driver Assembly for use between a spindle that is adapted to provide a coolant and a tap that is adapted to conduct such coolant therethrough, the tap driver assembly including a body in which a nose is slidably guided, a collet clamped by a nut in such nose, a slidable drive connection between the body and the nose which enables relative axial movement while providing an angular drive, spring means acting between the nose and the body so that the feed of the tap could lead or lag the feed of the spindle, and a fluid passage in the body leading from the spindle in bypassing relation to the slidable drive connection, bypassing the spring means, and extending through the nose, axially into the collet to the tap.

8 Claims, 2 Drawing Figures

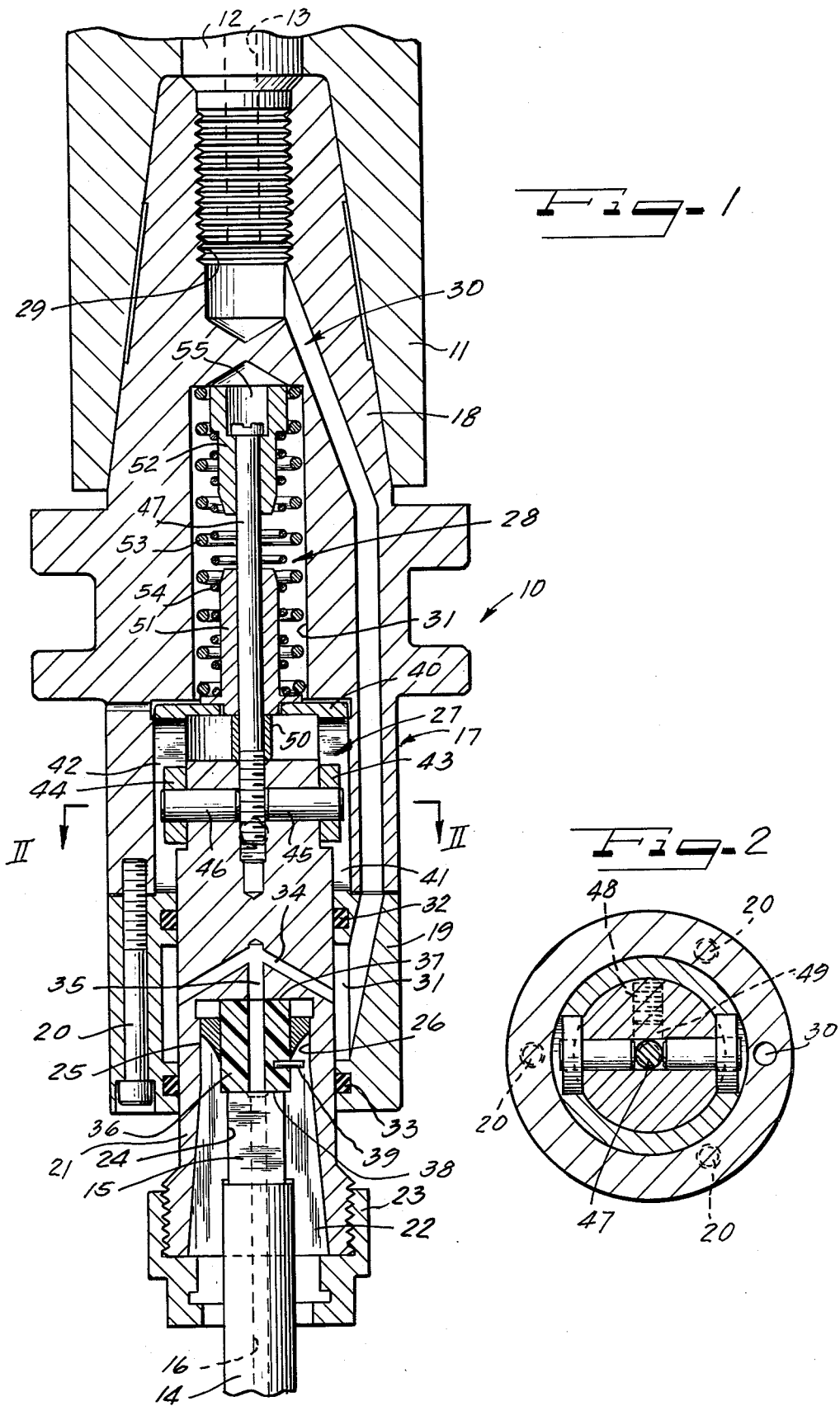

TAP DRIVER ASSEMBLY

BACKGROUND OF THE INVENTION

Field of the Invention

This invention relates to a tap driver assembly, and more specifically to one that enables axial yielding in combination with a coolant-through feature.

Prior Art

It has been known heretofore to provide tap drivers that permit the tap driver length to be altered in response to compression or tension forces applied thereto arising out of a difference of feed rate between the spindle and the tap.

Also, it has been known heretofore to provide a tap driver that enables coolant to be conducted from the spindle axially into the tap.

Also, it has been known heretofore to conduct coolant from a source other than the spindle into a tap driver for conduction to the end of a tap, particularly as taught in U.S. Pat. No. 3,024,030. This type of lateral feeding of fluid is carried out through a structure known as a coolant inducer.

It is also been known to use external flooding of the cutting area with a coolant, particularly where a compression-tension tap holder is used as is described above.

When numerically controlled machines are utilized, the various foregoing types of tool holders have in the past provided difficulties or impossibilities arising out of the lack of compatability of such tooling where a given spindle is provided in the machine tool.

SUMMARY OF THE INVENTION

The tap driver assembly of the invention is adapted for use between a spindle that is adapted to provide coolant, and a tap that has a coolant-through capacity. To this end, a tap driver having a compression and/or tension feature is combined with a coolant-through capacity where-in the coolant is kept isolated from the working parts that provide the compression and/or tension feature. A fluid passage is provided in the body of the device which extends from the securing means at the spindle, in bypassing relation to spring means and a slidable drive connection into an axially slidable nose and thence axially into a collet that holds the tap.

Accordingly, it is an object of the present invention to provide an improved tap driver assembly.

Another object of the present invention is to provide a tap driver assembly that combines the feature of coolant-through with a compression and/or tension feature without any coolant coming in contact with the components that provide the second feature.

A further object of the present invention is to provide a tap driver assembly with a coolant-through capability so that the same may be interchanged with other tooling used with conventional tool changers.

Yet another object of the present invention is to provide a tap driver assembly wherein external flooding is avoided and the use of a coolant inducer is avoided, but having the benefits thereof, while compensating for a difference between the feed rates of the spindle and the tap.

Many other objects, features and additional advantages of the present invention will become apparent to those skilled in the art from the drawing and the detailed description relating thereto.

BRIEF DESCRIPTION OF THE DRAWING

FIG. 1 is a cross-sectional view of a tap driver assembly provided in accordance with the present invention; and FIG. 2 is a cross-sectional view taken along line II—II of FIG. 1.

AS SHOWN ON THE DRAWING

The principles of the present invention are particularly useful when embodied in a tap driver assembly such as shown in FIG. 1, generally indicated by the numeral 10. The tap driver assembly 10 is illustrated in combination with the lower end of a spindle II of a machine tool, such as a numerically controlled machine tool having a threaded attachment member 12 that has a passage 13 connected to a source of coolant, as is conventional. At the other end, the tap driver assembly 10 is shown connected to a tap 14 that has a non-circular portion 15 by which it is driven, and an axial passage 16 through which coolant is introduced.

The tap driver assembly 10 includes a body generally indicated at 17 which includes a shank portion 18 and a detachable bushing 19 rigidly secured thereto by means of a number of screws 20. The assembly 10 further includes a nose 21 which is slidably guided in the body 17, more specifically slidably guided in the bushing 19, and which has a collet 22 of the split type therein, a nut 23 acting between the nose 21 and the collet 22 for clamping the collet and hence the tap 14. The collet 21 has a non-circular portion 24 which co-rotatably receives the portion 15 of the tap 14, the collet 22 further having a non-circular portion 25 which is co-rotatably carried in a bore 26 of corresponding configuration in the nose 21. A slidable drive connection generally indicated at 27 acts between the body 17 and the nose 21 to permit relative axial movement therebetween, while at the same time providing an angular drive therebetween. A spring means 28 acts between the nose 21 and the body 17 to bias the slidable drive connection 27. In the emodiment illustrated, the slidable drive connection 27 is biased to a neutral position so that the tap driver assembly 10 could be tensioned or compressed. If desired, one of these directions of movement could be omitted.

The body 17 includes securing means on its shank portion 18 which here includes a threaded bore 29 receptive of the member 12 and of coolant from the passage 13. The threaded bore 29 terminates axially so that coolant is not conducted therefrom except through a fluid passage generally indicated at 30. The body 17 has a second oppositely directed stepped bore 31 which receives the spring means 28, the slidable drive connection 27, and a portion of the nose 21.

The fluid passage 30 in the body extends from the securing means 29 in bypassing relation to the spring means 28 and in bypassing relation to the slidable drive connection 27, and then into the detachable bushing 19 which contains a tubular chamber 31 which opens radially toward the nose 21 and which extends in surrounding relation thereto. The detachable bushing 19 of the body 17 has a pair of seals 32,33 which respectively prevent the coolant from leaking toward the slidable drive connection 27 or the atmosphere.

The fluid passage 30 extends through a cross-passage 34 in the nose, the outer ends of which always register with the tubular chamber 31 for any axial position of the nose 21 with respect to the body 17. The fluid passage 30 then further extends in an axial portion 35 in the nose 21 and axially through a seal 36 which has an upper surface 37 which engages the nose 21 to form a coolant seal therewith, and a lower surface 38 for sealingly engaging the tap 14. A retainer 39 acts between the seal 36 and the collet 22 to hold these components together as a subassembly.

The bushing 19 of the body 17 has at its upper end a portion 40 which has the shape of an inverted cup which is integral with the bushing 19 just above the seal 32. The cup-shape 40 has a pair of vertically elongated slots 41, 42, there being a roller 43, 44 carried on a pin 45, 46 secured to the nose 27, the rollers 43, 44 being respectively disposed in the slots 41, 42. When angular driving force is imparted by the spindle II to the body shank 18, that force is transmitted through the screws 20 to the bushing 19, then to the inverted cup-shape 40, and from the walls of the slots 41, 42 to the rollers 43, 44 and thus to the nose 21 to drive the tap 14 in a positive manner. However, there can be a relative movement between the nose 21 and the body 17 by an amount determined by the length of the slots 41, 42, the rollers 43, 44 being engageable therewith to limit axial travel in both directions.

The spring means 28 serve in this embodiment to center the slidable drive connection 27 at the central portion of its stroke. To this end, an elongated screw 47 is threaded into the nose 21 where it is retained in a selected position by means of a set screw 48 which acts through a fiber pad 49 between the screws 47, 48. The shank of the screw 47 extends upwardly into the bore 31 and is surrounded at its lower end by a bushing 50 which can pass through an opening in the cup-shape 40 of the bushing 19. A pair of lower and upper combined washers and spring guides 51, 52 also surround the screw 47.

The spring means 28 includes a helical compression spring 53 acting between the washer portion of the spring guide 51 and the upper end of the body bore 31, and a second helical compression spring 54 acting at its lower end between the washer portion of the lower spring guide 51 and a washer portion of the upper spring guide 52. The head of the screw 47 is received in a recess 55 in the upper spring guide with sufficient clearance to permit the relative compressional movement described. Each of the spring guides 51, 52 includes an elongated portion acting on a periphery of the spring 54, here the inner periphery. The spring guides 51, 52 are spaced apart by a distance exceeding the compressional travel described.

With the tap driver assembly 10 installed in the spindle II, and with a tap 14 therein, coolant may be caused to flow through the passage 30 without contacting any of the relatively movable parts in the assembly, and to flow axially into the tap 14. At the same time, the tap 14 can be positively driven in either angular direction and if there is any difference in the feed rate between the spindle II and the tap 14, the slidable drive connection 27 will permit whatever compression or extension of the assembly is needed.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A tap driver assembly for a tap adapted to conduct coolant therethrough, comprising in combination:
    (a) a body having means at one end for securing it to a spindle adapted to provide coolant;
    (b) a nose slidably carried in said body;
    (c) a collet in said nose having a driving connection therewith and co-rotatably receptive of a tap;
    (d) a nut carried on said nose for clamping said collet; an
    (e) axially slidable angular drive connection between said body and said nose;
    (f) spring means acting axially between said nose and said body; and
    (g) a fluid passage extending in said body from said securing means, in radially outward bypassing relation to said slidable drive connection, and said spring means, and extending through said nose and axially into said collet.

2. A tap driver assembly according to claim 1, said body having a pair of oppositely directed bores terminating in non-fluid communicating relationship with each other, the first of said bores interconnecting said securing means and said fluid passage, and the second of said bores receiving said spring means, said slidable connection, and a portion of said nose.

3. A tap driver assembly according to claim 1, said body including a detachable bushing by which said nose receives its slidable support, said fluid passage including a tubular-shaped chamber in said bushing opening radially inwardly to said nose to the portion of said fluid passage which is axially movably carried by said nose.

4. A tap driver assembly according to claim 3 including a pair of seals acting between said detachable bushing and said nose at axially opposite sides of said tubular-shaped chamber.

5. A tap driver assembly according to claim 1, said spring means including a helical compression spring having elongated spring guide means acting on a periphery thereof.

6. A tap driver according to claim 1, including a seal disposed in said collet through which seal said fluid passage extends, one surface of said seal engaging said nose and an oppositely directed surface of said seal being engageable with the end of the tap.

7. A tap driver according to claim 6 including a retainer acting between said collet and said seal.

8. A tap driver according to claim 1 including an air vent in said body leading from said drive connection to the atmosphere.

* * * * *